March 26, 1957 — C. E. MYERS — 2,786,600
PRESSURE CONTROL DEVICE

Filed Dec. 30, 1954 — 3 Sheets-Sheet 1

INVENTOR
C. E. MYERS
BY R. Houston Brett
ATTORNEY

March 26, 1957 C. E. MYERS 2,786,600
PRESSURE CONTROL DEVICE
Filed Dec. 30, 1954 3 Sheets-Sheet 2

INVENTOR
C. E. MYERS
BY
ATTORNEY

March 26, 1957 C. E. MYERS 2,786,600
PRESSURE CONTROL DEVICE
Filed Dec. 30, 1954 3 Sheets-Sheet 3
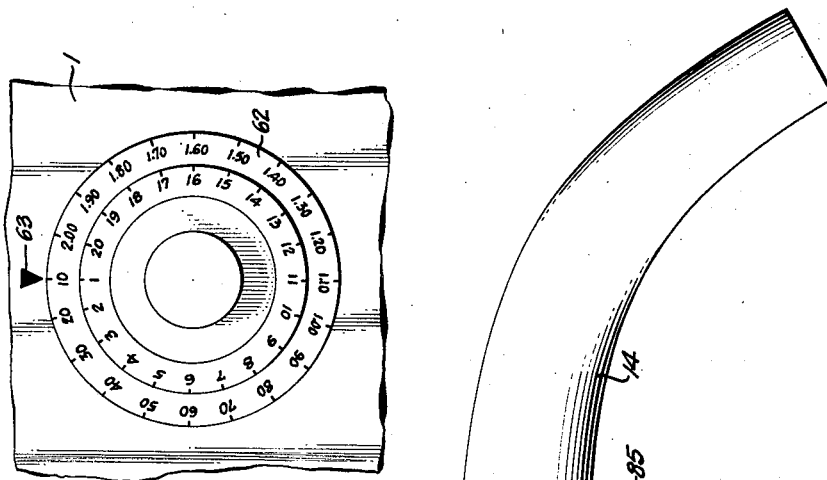
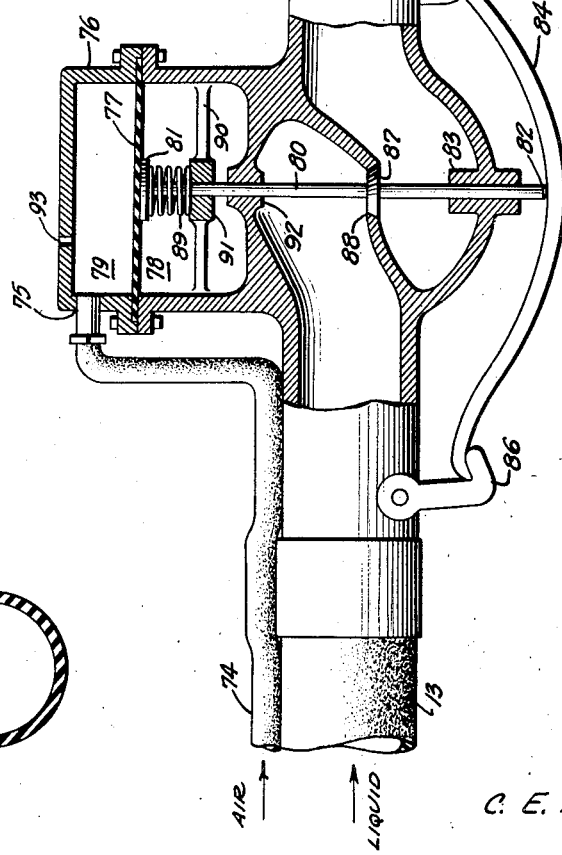
INVENTOR
C. E. MYERS
BY
ATTORNEY United States Patent Office 2,786,600
Patented Mar. 26, 1957

2,786,600

PRESSURE CONTROL DEVICE

Charles Elvin Myers, Chesterfield County, Va.

Application December 30, 1954, Serial No. 478,823

8 Claims. (Cl. 222—20)

This invention relates to new and useful improvements in a pressure control device, and more particularly to such a device used in controlling dispensing machines, and particularly gasoline dispensers commonly known as gasoline pumps.

The usual gasoline pump now practiced generally in the art requires an attendant to constantly attend the dispensing of gasoline unless the customer desires the automobile tank filled, in which case the flow of gasoline is automatically cut off. In other words, when a customer, for instance, desires ten gallons of gasoline or two dollars worth of this product, the attendant must constantly attend such dispensing as he must constantly watch the quantitative or price dials for such amount, and manually stop the flow of the product at the desired point.

One of the objects of this invention is the provision of a pressure controlled device used with a dispensing machine for predetermining the amount of a product to be dispensed, and to stop the dispensing of such product when such amount has been delivered, thereby enabling an attendant to perform other chores during such dispensing period.

Another object of this invention is the provision of a pressure controlled device used with a dispensing machine for predetermining the momentary amount of a quantity of a product to be dispensed, and to stop the dispensing of such product when the priced amount has been delivered, thereby enabling an attendant to perform other chores during such dispensing period.

A further object of this invention is the provision of a pressure controlled device used with a dispensing machine for predetermining and delivering a product by price or quantity and to stop such delivery at the predetermined point.

Figure 1:
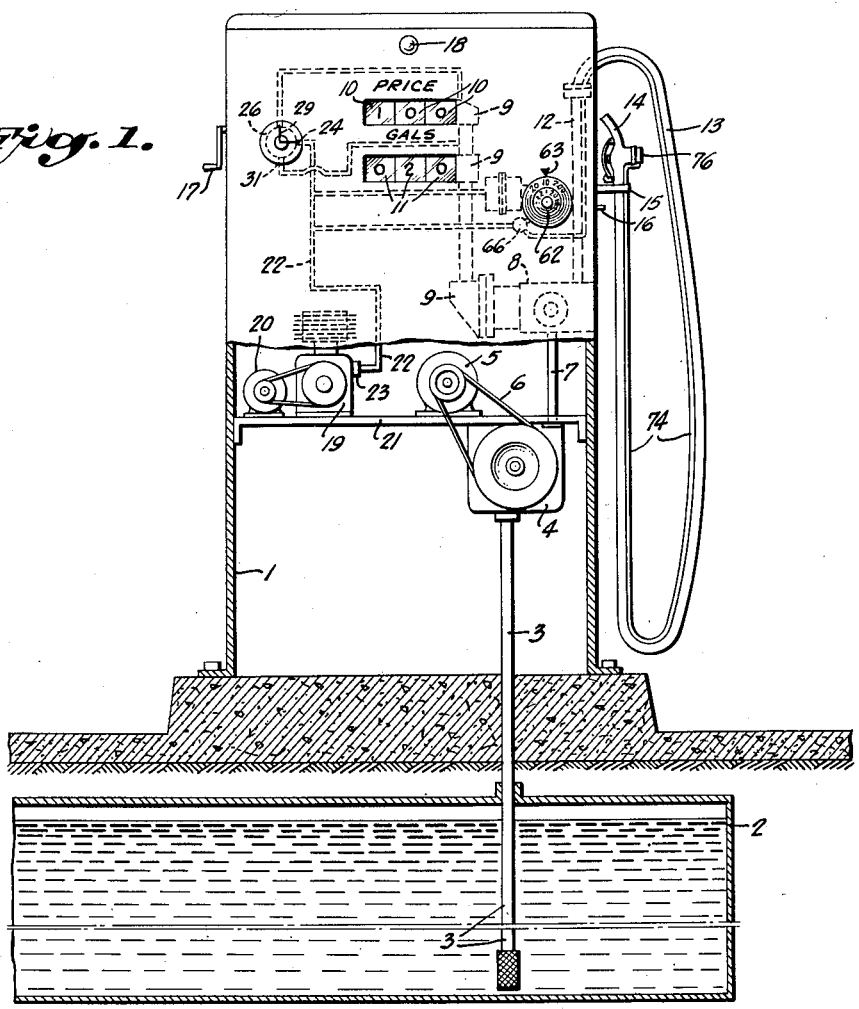
Figure 4:
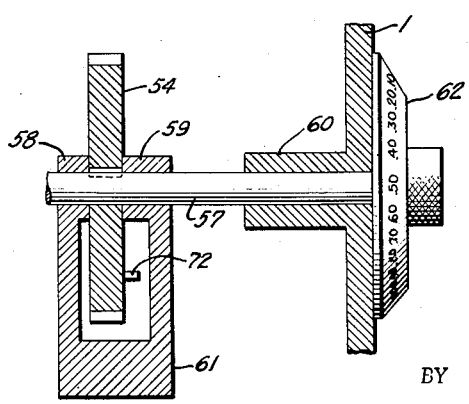
Figure 2:
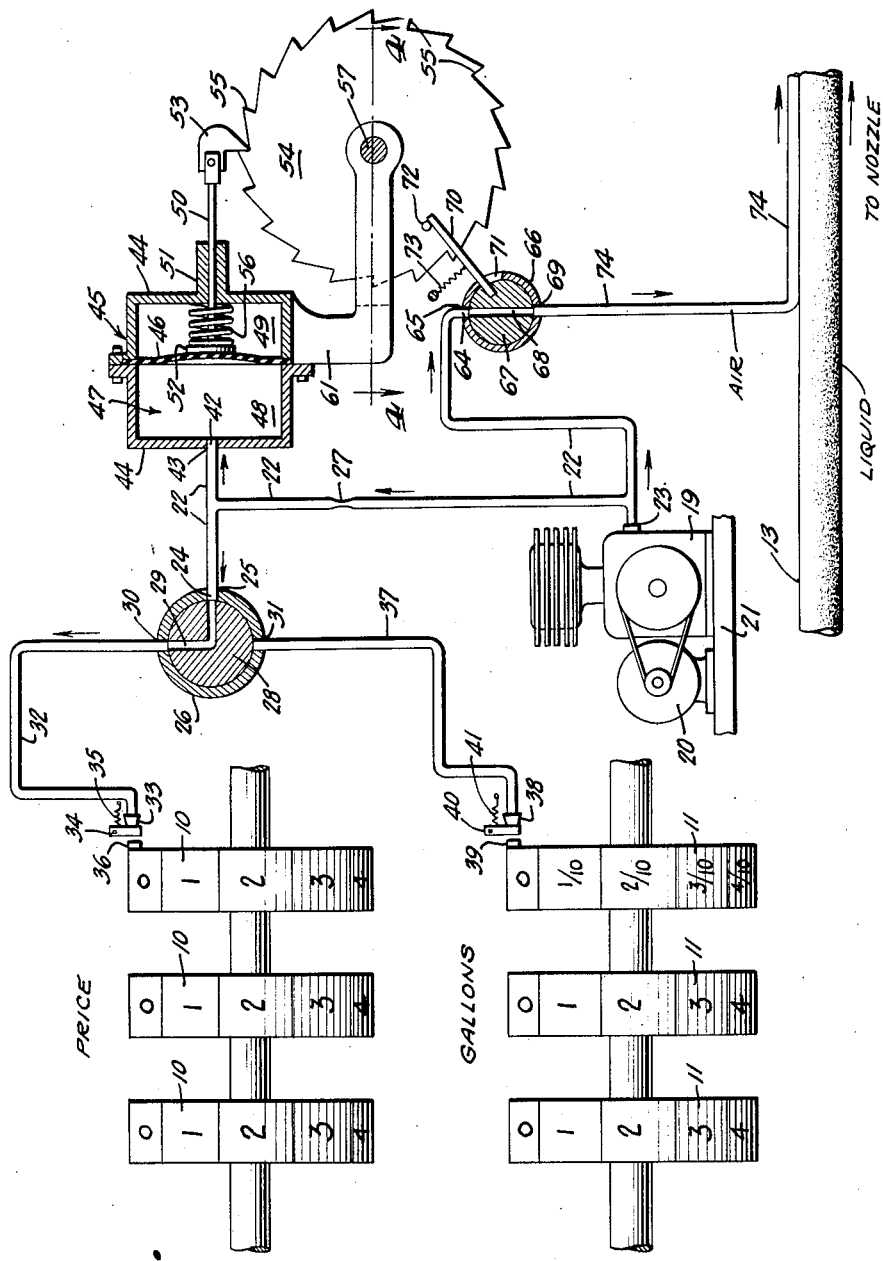

Other objects and features will more fully appear from the following description and accompanying drawings, in which:

Fig. 1 is a fragmentary sectional elevation of a liquid dispensing device embodying a substantial portion of the invention, Fig. 2 is a diagrammatic view of the invention as used with a dispensing device, Fig. 3 is a sectional view of a nozzle embodying a portion of the invention, Fig. 4 is a sectional view taken along lines 4—4 of Fig. 2 and looking in direction of the arrows, Fig. 5 is a front view of a price and quantity dial, and Fig. 6 is a cross sectional view of a conduit or gasoline hose having a pressure tube thereon.

Referring more particularly to the drawings one adaptation of this invention may be illustrated by the usual gasoline pump 1 which is provided with a fuel tank 2 in close proximity thereto, and a supply pipe 3 engages tank 2 that is connected to a pump 4 operated by an electric motor 5 through a belt 6, and gasoline is thus pumped from the tank by such means. A pipe 7 has one of its ends connected to the pump and its other end to a liquid measuring meter 8 which is adapted to measure a liquid to be dispensed. A casing 9 embodying the usual gear system (not shown, but well known in the art) operates price dials 10 and quantity dials 11. A pipe 12 has one of its ends connected to meter 8 and its other end to a hose 13 having a nozzle 14 adapted to be seated in a rack 15 on the pump. A lever 16 under the rack is adapted to throw a switch to start and stop motor 5 thereby starting or stopping the flow of gasoline.

The pump is provided with the usual handle 17 for re-setting dials 10 and 11, and also the common sight-window 18 for observing the flow of gasoline. It is thought that the foregoing structure is sufficient for the purpose of this invention to illustrate applicant's device.

Now referring more particularly to the invention (Fig. 2), an air compressor 19 is provided with the usual electric motor 20, both being secured to a platform 21 which is fastened to the casing of pump 1. It is to be understood that the air pressure may be supplied from points without the pump casing in order to avoid electrical sparks and particularly with a view of safety. A tube 22 has an end 23 connected to the compressor and another end 24 secured in a port 25 of a three way valve 26. A stricture 27 is disposed in said tube 22 and will be more fully explained hereinafter. A rotary plug 28, in valve 26 has an angular channel 29 therein that is adapted to register with port 25 and a port 30 in said valve, or with port 25 and a port 31 in valve 26.

A tube 32 has one of its ends secured in port 30 and its other end fastened to a nozzle 33. An iron bar 34 is secured in pivotal fashion and held against the nozzle by a spring 35, to normally prevent the escape of air. A magnet 36 is secured to the side edge of dial 10 and when the dial rotates it carries the magnet by the bar and attracts it, thereby causing nozzle 33 to be opened and permit the escape of air. As the magnet passes bar 34 and out of the operating magnetic field range, spring 35 pulls it back upon the nozzle to stop the flow of air, which flow comes from compressor 19, tube 22, channel 29, tube 32 and nozzle 33.

A tube 37 has one of its ends secured in port 31 and the other of its ends in nozzle 38 similar to nozzle 33. A magnet 39 is adapted to attract an iron bar 40 in similar fashion and function as bar 34, and has a spring 41 fixed thereto that likewise functions as spring 35. Magnets 36 and 39 may be varied in length, depending upon the time the air is desired to be permitted to escape.

Another end 42 of tube 22 is secured in a port 43 in a casing 44 of a diaphragm housing 45. A diaphragm 46 is mounted in a chamber 47 of housing 45 and divides said chamber into two compartments 48 and 49. A rod 50 is mounted in slidable fashion in a bearing 51 on casing 44 and has one of its ends 52 secured to diaphragm 46, and to the other of its ends is mounted, in pivotal fashion, a pawl 53 that is in operative relation with a ratchet wheel 54 provided with a plurality of teeth 55. A spring 56 has one of its ends seated upon end 52 of rod 50 and its other end upon casing 44 of housing 45. Ratchet wheel 54 is mounted upon an axle 57 (Figs. 2–4) journaled in bearings 58, 59 and 60. Bearings 58 and 59 are at the free end of bracket 61, which bracket is secured to the basal portion of housing 45, while bearing 60 is mounted upon the casing of pump 1. The spring 56 (Fig. 2) tends to normally force the diaphragm towards compartment 48, and air pressure in compartment 48 tends to prevent the diaphragm from moving towards said compartment. However, as will be more fully explained hereinafter, when the air pressure is released by bar 34, such pressure is reduced in compartment 48, and the spring forces the diaphragm towards said compartment, thereby actuating rod 50 which in turn carries pawl 53 with it, and the latter engages one of the teeth 55 causing wheel 54 to rotate.

A graduated dial 62 (Fig. 5) is mounted fixedly upon one end of axle 57 and adapted to rotate wheel 54 manually. A pointer or indicator 63 is located on the casing of pump 1, and is in operative relation with respective price and quantity graduations on dial 62.

Another end 64 of tube 22 is secured in a port 65 of a two-way valve 66 provided with a rotary plug 67 having a channel 68 therein, and being adapted to register with port 65 and a port 69 in said valve. A trip lever 70 is connected to plug 67 and projects through a slot 71. The lever is along side of wheel 54 and in the path of a peg 72 secured to one side of said wheel. A spring 73 has one of its ends secured in fixed position and its other end anchored to lever 70, thereby normally forcing said lever against the upper portion of slot 71 so as to maintain channel 68 in registration with ports 65 and 69. A tube 74 is secured to hose or conduit 13, and has one of its ends secured in port 69 and its other end in a port 75 of a diaphragm housing 76. A diaphragm 77 is secured to said housing so as to form compartments 78 and 79.

A valve stem 80 has one of its ends 81 secured to diaphragm 77 and its other end 82 projects beyond a bearing 83 for engagement with a lever 84 pivotally mounted in a bearing 85 fixed to nozzle 14. A trip latch 86 engages the free end of lever 84, and when the latch locks the lever a valve disc 87 on stem 80 engages a valve seat 88 in said nozzle thereby preventing the flow of a liquid from hose 13 through nozzle 14. A spring 89 has one of its ends seated upon end 81 of stem 80 and its other end disposed upon a seat or spider 90 in said housing, said element having a bearing 91 through which stem 80 is slidably mounted. A bearing 92 also accommodates stem 80 in similar fashion so as to maintain proper stem alignment. A vent 93 is disposed in the top of housing 76 to permit the slow or gradual escapement of air, but at no time is the air escapement sufficient to cause the reduction of pressure in compartment 79 so as to permit the valve disc 87 to seat itself in closed position, except when the air supply in compartment 79 is stopped.

The device functions as follows: When a customer desires to purchase gasoline by the price, he approaches the attendant and asks, for instance, for fifty cents worth of gasoline. The attendant turns the rotary plug 28 in valve 26 so that channel 29 engages ports 25 and 30. The attendant then turns dial 62 (Fig. 5) until the fifty cents symbol registers with indicator 63, and when this is done wheel 54 moves peg 72 five notches from lever 70, it being assumed that each notch represents ten cents worth of gasoline. The trip lever 16 on pump 1 is then moved to cause motor 5 to operate pump 4 for supplying the gasoline to be dispensed. Nozzle 14 is then inserted in a receptacle and latch 86 is moved out of the path of lever 84 thus permitting valve disc 87 to unseat itself.

Compressed air, of course, is in tube 22, channel 29, tube 32 and nozzle 33, where it is held against escapement by bar 34. Compressed air is also in compartment 48 of the housing 45. Such air is also in tube 22, channel 68, tube 74 and compartment 79, so that when lever 84 is open, the compressed air forces the valve disc 87 away from its seat 88 and gasoline begins to flow through the hose and nozzle into the receptacle. As the gasoline is flowing dial 10 rotates or turns and when its magnet 36, which is set on the ten cent segment, is passing bar 34 it pulls or attracts it and moves from nozzle 33 to permit the escapement of air. When the air escapes the pressure is reduced in compartment 48 and spring 56 forces diaphragm 46 towards port 43 which causes pawl 53 to move wheel 54 by engagement with one of the teeth 55. After magnet 36 passes bar 34 spring 35 forces it against nozzle 33 thus stopping the escape of air, and the pressure is again built up in compartment 48, thereby forcing the pawl into the valley of the next tooth.

When wheel 10 rotates five times to deliver fifty cents' worth of gasoline, it will cause pawl 53 to be actuated five times and at the completion of the fifth movement, peg 72, which has been coming closer to lever 70 during each pawl and ratchet action, trips lever 70 causing channel 68 to move out of the path of ports 65 and 69, thus stopping the air pressure on tube 74. When the pressure is stopped in tube 74 spring 89 forces valve disc 87 upon its seat as air bleeds or escapes through vent 93, thereby stopping the flow of gasoline. Latch 86 is then moved into engagement with lever 84 so as to manually maintain valve disc 87 against seat 88.

When air is bled, or is permitted to escape from nozzle 33, the pressure is naturally reduced in compartment 48 of housing 45. However, by the provision of constriction 27 in tube 22 pressure is maintained in tube 74 and compartment 79, as such constriction is made so as to compensate for such air escapement and to maintain sufficient pressure on diaphragm 77 (Fig. 3) so that the valve will remain open until peg 72 engages lever 70 to trip it.

Now let us assume that a customer desires to purchase gasoline by the quantity, say, for instance, five gallons. The attendant turns rotary plug 28 in valve 26 so that channel 29 registers with ports 25 and 31. Such channel position forms an air passage from compressor 19, tube 22, channel 29, tube 37 and nozzle 38.

The attendant then turns dial 62 (Fig. 5) to the numeral 5 in the central concentric circle so that it will register with indicator 63. He then trips trip lever 16 on the pump for starting the motor. Wheel 10 is divided into tenths of a gallon and each segment represents one tenth of a gallon. The wheel also has magnet 39 and functions in similar fashion to magnet 36. When wheel 11 makes a complete revolution, the magnet 39 attracts bar 40 thereby opening the nozzle and deflating compartment 48 thus causing the pawl and ratchet operation to function as hereinbefore described. When wheel 11 makes five complete revolutions, the amount of five gallons of gasoline has been dispensed, and peg 72 moves into engagement with lever 70 to cause rotary plug 67 to move channel 68 into a closed position thereby stopping the flow of air in tube 74, and upon diaphragm 77 this causing valve disc 87 to be seated and stop the flow of gasoline, as hereinbefore more fully described.

It is to be understood that within the realm of equivalents actuation of the diaphragms may also be accomplished by other means than air, such, for instance, in the operation of a water meter, water pressure may be used in place of air. It is also to be noted the control of air at nozzles 33 and 38 may be accomplished in other ways than by a magnetic bar control, such, for instance, as the provision of a hole in the dial and the nozzle placed close thereto in order to obtain a minimum of air escapement. Of course there will be a small amount of bleeding, but this will not interfere with the normal operation of the device. Applicant is aware of electrical devices to predetermine the quantity or price of a product to be dispensed, but is not apprised of any such device operated by pressure control, nor does he know of any device for counting by pressure control means.

Having described this invention, what is claimed is:

1. A pressure controlled device in combination with a dispensing machine provided with a measuring meter and a plurality of calibrated dials for the quantitative measuring and the monetary pricing of a product to be dispensed through a conduit, consisting of a source of pressure, a plurality of tubes for conveying said pressure in juxtaposition to and in operative relation with one of said dials, a diaphragm disposed in a housing and in operative relation with said dial by a plurality of tubes, tension means operable with said diaphragm, means engaging said diaphragm for actuating a predetermined tripping mechanism upon the increase or decrease of pressure upon said diaphragm, a housing provided with a diaphragm under constant tension, said last named diaphragm adapted to actuate means for controlling the dispensing of a product upon the increase or decrease of pressure thereon.

2. A pressure controlled device in combination with a dispensing machine provided with a measuring meter and a plurality of calibrated dials for the quantitative measuring and the monetary pricing of a product to be dispensed through a conduit having a nozzle thereon, consisting of a source of pressure, a plurality of tubes for conveying said pressure in juxtaposition to and in operative relation with one of said dials, means on one of said dials for controlling the increase or decrease of pressure, a diaphragm disposed in a housing and under constant tension and being in operative relation with said dial by a plurality of tubes and pressure, means in operative relation with said diaphragm consisting of a spring, rod, pawl and ratchet wheel for actuating a peg adapted to engage a lever upon a plug so as to produce an increase or decrease of pressure on said diaphragm, a housing provided with a second diaphragm adapted to actuate means for controlling the dispensing of a product when pressure is increased or decreased.

3. A pressure control device in combination with a dispensing machine provided with a measuring meter and a plurality of calibrated dials for the quantitative measuring and the monetary pricing of a product to be dispensed through a conduit provided with a nozzle, consisting of a diaphragm under tension and in operative relation with one of said price dials by pressure from a source of supply and conveyed by a plurality of tubes, means on said price dial for controlling the increase or decrease of pressure upon said diaphragm, a wheel notched to coincide with the quantitative and monetary graduations of a dial and in operative relation therewith, tripping means on said wheel, means for engaging said diaphragm and wheel to cause the latter to be actuated upon the increase or decrease of pressure on the diaphragm, a second diaphragm in operative relation with said conduit and nozzle thereon, and adapted to control the dispensing of a product upon the increase or decrease of pressure upon said second diaphragm.

4. A pressure controlled device in combination with a dispensing machine, said device consisting of a source of pressure controlled mechanism which is adapted to dispense a product from said dispensing machine in predetermined quantitative amount and price amount by controlled pressure and mechanism in operative relation therewith.

5. A pressure controlled device in combination with a dispensing machine consisting of a source of pressure supply, a diaphragm adapted to receive pressure through a plurality of tubes in operative relation with said source, means in operative relation with said dispensing machine to cause the pressure on said diaphragm to be increased or decreased so as to actuate a pawl in operative relation with a wheel and cause the latter to move, a second diaphragm in operative relation with a nozzle on a conduit of said dispensing machine adapted to receive a pressure from said source through a plurality of tubes, means on said wheel for engagement with a valve to stop or start the pressure in said conduit and thereby cause said second diaphragm to operate means for controlling the dispensing of a product.

6. A pressure controlled device in combination with a dispensing machine provided with a measuring meter and a plurality of dials for the quantitative measuring and the monetary pricing of a product to be dispensed through a conduit; said device consisting of a source of pressure, a plurality of tubes for conveying said pressure from said source; a valve having a channel therein adapted to divert the course of said conveyed pressure; a tube having one of its ends engaging said valve and its other end provided with pressure stopping means; means on one of said dials in operative relation with and controlling said stopping means; a diaphragm under tension housed in a chamber and in operative relation with means for actuating a wheel; a tube engaging said valve and chamber for conveying pressure to the latter to cause said means to be actuated; a second valve for conveying a source of pressure to a compartment and adapted to control the flow of pressure by means on said valve in operative relation with said wheel; a diaphragm under tension in said compartment in operative relation with a valve normally seated to prevent the flow of a product through a hose and nozzle so long as pressure is absent in said compartment, and to permit said product flow when pressure is in said compartment and a lever engaging said valve is released.

7. A pressure controlled device in combination with a dispensing machine provided with a measuring meter and a plurality of dials for the quantitative measuring and the monetary pricing of a product to be dispensed through a conduit; said device consisting of a source of pressure; a plurality of tubes for conveying said pressure from said source; a valve for diverting said pressure from one controlled course to another controlled course; means in operative relation with a diaphragm under tension in a compartment and in operative relation with said valve; said means adapted to actuate a wheel and means on said wheel adapted for engagement with a lever secured to a valve for controlling the flow of pressure to means provided with mechanism for controlling the flow of a product.

8. A pressure controlled device in combination with a dispensing machine provided with a measuring meter and a plurality of dials for the quantitative measuring and the monetary pricing of a product to be dispensed through a nozzled conduit; said device consisting of a source of pressure having an operable connection with a valve for diverting pressure from one course to another course said courses being in operative relation with and respectively controlled by a price dial and a quantitative dial; a wheel; mechanism controlled by said pressure controlling price and quantitative dials and in operative relation with said wheel for actuating the latter; mechanism in operative relation with said wheel for controlling the flow of a product through a conduit engaging said dispensing machine; and mechanism for controlling the flow of a liquid from a nozzle engaging said conduit.

References Cited in the file of this patent

UNITED STATES PATENTS

| 1,249,189 | Poole | Dec. 4, 1917 |
| 1,408,348 | Dapron | Feb. 28, 1922 |
| 1,724,429 | Shield | Aug. 13, 1929 |
| 1,957,398 | Wallace | May 1, 1934 |
| 2,269,937 | Hart | Jan. 13, 1942 |
| 2,365,192 | Hazard | Dec. 19, 1944 |
| 2,460,275 | Bergman et al. | Feb. 1, 1949 |